(12) United States Patent
Kondapavuluru et al.

(10) Patent No.: US 11,539,668 B2
(45) Date of Patent: Dec. 27, 2022

(54) SELECTIVE TRANSPORT LAYER SECURITY ENCRYPTION

(71) Applicant: Juniper Networks, Inc., Sunnyvale, CA (US)

(72) Inventors: Goutham Kondapavuluru, Bangalore (IN); Sharanagoud B. Devaraddi, Bangalore (IN); Rajesh S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 73 days.

(21) Appl. No.: 17/136,414

(22) Filed: Dec. 29, 2020

(65) Prior Publication Data
US 2021/0385195 A1 Dec. 9, 2021

(30) Foreign Application Priority Data
Jun. 3, 2020 (IN) .............................. 202041023290

(51) Int. Cl.
*H04L 29/06* (2006.01)
*H04L 9/40* (2022.01)
*H04L 9/06* (2006.01)

(52) U.S. Cl.
CPC ........ *H04L 63/0272* (2013.01); *H04L 9/0643* (2013.01); *H04L 63/0428* (2013.01); *H04L 63/061* (2013.01); *H04L 63/166* (2013.01)

(58) Field of Classification Search
CPC ............... H04L 63/0272; H04L 63/166; H04L 63/0428; H04L 63/061; H04L 9/0643; H04L 9/0838; H04L 9/0618

USPC .......................................................... 713/151
See application file for complete search history.

(56) References Cited

U.S. PATENT DOCUMENTS

| | | | | |
|---|---|---|---|---|
| 6,601,106 B1 * | 7/2003 | Moberg | ................. | H04L 29/06 370/409 |
| 7,817,571 B2 * | 10/2010 | Claise | .................. | H04L 63/101 370/254 |
| 8,015,603 B2 * | 9/2011 | Zhang | ................... | H04W 12/02 726/13 |
| 8,990,892 B2 * | 3/2015 | Yadav | ................. | H04L 63/0884 713/168 |
| 9,420,003 B2 * | 8/2016 | Bhalerao | ................ | H04L 63/20 |
| 9,686,294 B2 * | 6/2017 | Kantor | .................... | H04W 4/40 |
| 9,712,504 B2 * | 7/2017 | Kurmala | ............. | H04L 63/0272 |
| 10,341,311 B2 * | 7/2019 | Smith | ..................... | H04L 63/06 |
| 11,012,327 B2 * | 5/2021 | Raney | ................. | G06F 9/45558 |

(Continued)

OTHER PUBLICATIONS

Extended European Search Report for Application No. 21159316.5, dated Aug. 19, 2021, 12 pages.

(Continued)

*Primary Examiner* — Amare F Tabor
(74) *Attorney, Agent, or Firm* — Harrity & Harrity, LLP

(57) ABSTRACT

A device may transmit a packet for communicating via a tunnel. The packet may be associated with a protocol. The device may determine that the packet has been dropped by a security device. The device may selectively encrypt, after determining that the packet has been dropped, the packet using a null encryption for transport layer security (TLS) or a combination of encryption associated with the protocol and TLS encryption to generate an encrypted packet. The device may transmit the encrypted packet for communicating via the tunnel.

20 Claims, 12 Drawing Sheets

(56) References Cited

U.S. PATENT DOCUMENTS

| | | | |
|---|---|---|---|
| 11,190,442 B2 * | 11/2021 | McNally | H04L 63/0272 |
| 2004/0266420 A1 * | 12/2004 | Malinen | H04L 63/0209 |
| | | | 455/421 |
| 2013/0166905 A1 * | 6/2013 | Wollbrand | H04L 63/164 |
| | | | 713/151 |
| 2016/0315920 A1 * | 10/2016 | Kurmala | H04L 63/0471 |
| 2017/0026349 A1 | 1/2017 | Smith et al. | |

OTHER PUBLICATIONS

Rodriguez et al., "TCP/IP Tutorial and Technical Overview," TCP/IP Tutorial and Technical Overview, Aug. 2001, XP002276979, 145 pages.

Wood et al., "A Survey of Transport Security Protocols; Draft-ietf-taps-transport-security-06.txt;internet-draft: Network Working Group, Internet Engineering Task Force, Ietf; Standard Working Draft, Internet Society," No. 6, Mar. 2019, pp. 1-37, Retrieved from the Internet: URL:https://tools.ietf.org/html/draft-ietf-tapstransport-security-06 , [retrieved on Mar. 11, 2019].

Pauly et al., "TCP Encapsulation of IKE and IPsec Packets," Cisco Systems, Internet Engineering Task Force (IETF), Standards Track, Aug. 2017 (25 pages).

* cited by examiner

SELECTIVE TRANSPORT LAYER SECURITY ENCRYPTION

CROSS-REFERENCE TO RELATED APPLICATION

This application claims priority to Indian Provisional Patent Application No. 202041023290 entitled "SELECTIVE TRANSPORT LAYER SECURITY ENCRYPTION," filed on Jun. 3, 2020. The entire content of which is expressly incorporated herein by reference.

BACKGROUND

A virtual private network (VPN) may enable devices to communicate securely across a public network, such as the Internet. In this regard, a first device may transmit one or more network packets (e.g., data packets), over the public network, to a second device to establish a VPN connection between the first device and the second device. The one or more network packets may be routed to a network device (e.g., a firewall or other network security device) and the network device may inspect the one or more network packets to determine whether the one or more network packets may be transmitted to the second device to establish the VPN connection.

SUMMARY

According to some implementations, a method may include transmitting, by a device, a packet for establishing or communicating on a virtual private network (VPN), the packet being associated with a protocol; determining, by the device, that the packet has been dropped by a security device; encapsulating, by the device and when the packet has been dropped, the packet with transmission control protocol (TCP) encapsulation to generate a TCP encapsulated packet; transmitting, by the device, the TCP encapsulated packet for establishing or communicating on the VPN; determining, by the device, that the TCP encapsulated packet has been dropped by the security device; selectively encrypting, by the device and when the TCP encapsulated packet has been dropped, the packet using a null encryption for transport layer security (TLS) or a combination of encryption associated with the protocol and TLS encryption to generate an encrypted packet; and transmitting, by the device, the encrypted packet on the VPN for establishing or communicating on the VPN.

According to some implementations, a device may include one or more memories and one or more processors. The one or more processors may be configured to: transmit a packet for communicating with a remote device, the packet being associated with a protocol; determine that the packet has been dropped by a security device; encrypt, after determining that the packet has been dropped, the packet using a null encryption for transport layer security (TLS) to generate a first encrypted packet; transmit the first encrypted packet for communicating with the remote device; determine that the first encrypted packet has been dropped by the security device; encrypt, after determining that the first encrypted packet has been dropped, the packet using a combination of encryption associated with the protocol and TLS encryption to generate a second encrypted packet; and transmit the second encrypted packet for communicating with the remote device.

According to some implementations, a non-transitory computer-readable medium may store one or more instructions. The one or more instructions, when executed by one or more processors of a device, may cause the one or more processors to: transmit a packet for communicating via a tunnel, the packet being associated with a protocol; determine that the packet has been dropped by a security device; selectively encrypt, after determining that the packet has been dropped, the packet using a null encryption for transport layer security (TLS) or a combination of encryption associated with the protocol and TLS encryption to generate an encrypted packet; and transmit the encrypted packet for communicating via the tunnel.

DETAILED DESCRIPTION

Figure 1A:
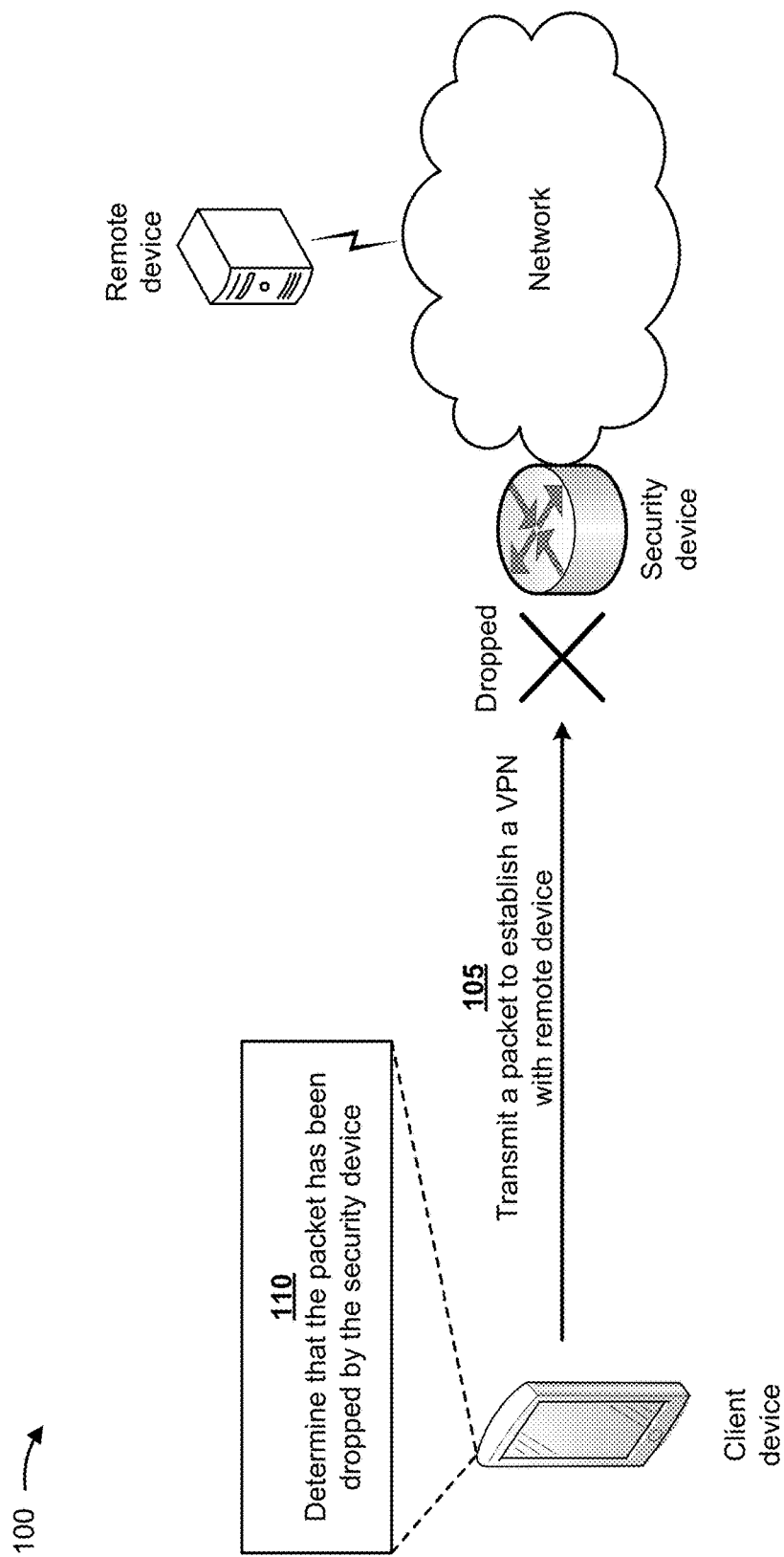
FIGS. 1A-1F are diagrams of one or more example implementations described herein.

The following detailed description of example implementations refers to the accompanying drawings. The same reference numbers in different drawings may identify the same or similar elements.

Devices may communicate securely over a public network, such as the Internet, using a virtual private network (VPN) connection between the devices. For example, a client device may seek to communicate securely, via the public network, with a remote device using a tunnel by establishing a VPN tunnel (e.g., an Internet Protocol Security (IPsec) tunnel) to the remote device. The client device may be connected to a local area network (LAN) (e.g., a wireless LAN) associated with an entity and the remote device may be connected to a private network (e.g., a private network of an entity that is different from the entity associated with the LAN). In this regard, in order to establish and/or communicate on the VPN tunnel, the client device may transmit a packet toward the remote device. The packet may be an Internet key exchange (IKE) packet (e.g., a network packet formatted in accordance with an IKE protocol). Alternatively, the packet may be an encapsulating security payload (ESP) packet (e.g., a network packet formatted in accordance with an ESP protocol).

Outbound traffic from the LAN may be regulated by a firewall connected to the LAN. Accordingly, the packet may be routed to the firewall for processing prior to being routed external to the LAN. For example, the firewall may process the packet using one or more firewall policies to determine whether the packet may be transmitted external to the LAN or should be dropped. In some instances, the one or more firewall policies may include a policy that allows transport layer security (TLS) traffic (e.g., packets formatted in accordance with a TLS protocol) and blocks any other network traffic. Accordingly, the firewall may drop the packet from the client device based on the policy that allows TLS traffic and blocks any other network traffic (because the packet is not formatted in accordance with the TLS protocol).

The client device may determine that the packet has been dropped (e.g., by the firewall) if the client device does not receive a response to the packet within a threshold amount of time following transmission of the packet. Accordingly, the client device may attempt to bypass the firewall by encapsulating the packet using a transmission control protocol (TCP) encapsulation technique. For example, the client device may add, to the packet, a TCP header (e.g., including information identifying a TCP port number). The client device may encapsulate the packet using a TLS encapsulation technique to prevent the packet from being dropped, in the event the firewall processes packets using a deep packet inspection (e.g., to identify TLS packets). In this regard, if the packet is an IKE packet, the client device may encrypt the IKE packet using an encryption technique that is based on the IKE protocol and may further encrypt the IKE packet using an encryption technique that is based on the TLS protocol. If the packet is an ESP packet that has been encrypted using an encryption that is based on the ESP protocol, the client device may further encrypt the ESP packet using the encryption technique that is based on the TLS protocol.

Accordingly, the client device may use multiple encryption techniques to prevent the packet from being dropped by the firewall.

Therefore, current techniques encapsulate and encrypt packets using multiple encryption techniques and decapsulate and decrypt the packets using multiple corresponding decryption techniques in order to establish and/or communicate on a VPN connection. Using multiple encryption techniques and multiple corresponding decryption techniques to encrypt and decrypt each packet of a plurality packets in order to establish and/or communicate on a VPN connection consumes computing resources, battery power, and/or the like of the devices on both ends of the VPN connection.

According to some implementations described herein, a device (e.g., a client device) may selectively encrypt a packet transmitted to establish and/or communicate via a VPN. For example, the device may seek to communicate securely, via a public network, with a remote device using a tunnel by establishing a VPN tunnel (e.g., an Internet Protocol Security (IPsec) tunnel) to the remote device. The device may be connected to a LAN (e.g., a wireless LAN) associated with an entity and the remote device may be connected to a private network (e.g., a private network of an entity that is different from the entity associated with the LAN). Outbound traffic from the LAN may be regulated by a security device (e.g., a firewall) connected to the LAN.

In order to establish and/or communicate on the VPN tunnel, the device may transmit a packet (associated with a protocol) toward the remote device. After determining that the packet has been dropped by the security device, the device may selectively encrypt the packet using a null encryption for TLS (e.g., null cipher or no cipher, and therefore no encryption) or a combination of an encryption associated with the protocol and TLS encryption to generate an encrypted packet. The device may transmit the encrypted packet to establish or communicate via the VPN. The security device may treat the encrypted packet as a TLS packet and permit the TLS packet to be transmitted toward the remote device.

Accordingly, the device (e.g., client device) described herein may selectively encrypt a packet (e.g., using a null encryption for TLS or a combination of an encryption associated with the protocol and TLS encryption) to establish and/or communicate via a VPN instead of using multiple encryption techniques to encrypt each packet of a plurality packets to establish and/or communicate via a VPN. By selectively encrypting the packet, the device may conserve computing resources (e.g., processing resources, memory resources, communication resources, and/or the like), battery power, and/or the like of the device and the remote device that would have otherwise been used to encrypt the packet using the multiple encryption techniques and decrypt the packet using multiple decryption techniques.

FIGS. 1A-1F are diagrams of one or more example implementations 100 described herein. As shown in FIGS. 1A-1F, example implementation(s) 100 may include a client device, a security device, a remote device, and a network. The client device may include a mobile device, a computer, and/or the like. The security device may include a network security device such as, for example, a firewall or another type of network security device. The remote device may include a server device, another client device, and/or the like. The network may include a public network such as, for example, the Internet. The client device may be connected to a LAN associated with an entity and the remote device may be connected to a private network (e.g., a private network of an entity that is different from the entity associated with the LAN). The client device, the security device, the remote device, and the network are further described below in connection with FIGS. 2, 3, and 4.

As shown in FIG. 1A, and by reference number 105, the client device may transmit a request to establish a VPN with the remote device. In some implementations, the client device may be executing a VPN application that causes a user interface to be provided to a user of the client device. The user interface may provide information identifying the remote device (e.g., a name, an identifier, a network address, and/or the like) and provide an option to establish the VPN with the remote device. The user may select the option to establish the VPN with the remote device and, based on selection of the option, the VPN application may cause the client device to transmit the request to establish the VPN with the remote device. For example, the client device may transmit a packet for establishing the VPN.

In some implementations, when establishing a VPN, the VPN application of the client device may establish an IPSec tunnel or, in other words, establish network tunnels that implement IPSec Security Association (SA). In this regard, the VPN application may use, for example, an IKE protocol to establish the VPN. Accordingly, when transmitting the packet for establishing the VPN, the client device may transmit an IKE packet as part of an IKE procedure to establish the VPN (e.g., a VPN tunnel) with the remote device.

Outbound traffic of the LAN may be regulated by the security device. Accordingly, the packet (transmitted by the client device) may be routed to the security device. The security device may process the packet (e.g., using one or more security policies) to determine whether the packet is to be transmitted (e.g., external to the LAN) or is to be dropped. When processing the packet, the security device may inspect the packet (e.g., inspect information about the packet such as header(s), source and destination information, format, and/or the like) to determine whether the information about the packet complies with the one or more security policies.

In some instances, the one or more security policies may include a TLS policy. The TLS policy may include a security policy that permits TLS traffic (e.g., packets formatted in accordance with a TLS protocol) to be transmitted external to the LAN and blocks any other traffic (e.g., packets that are not formatted in accordance with a TLS protocol) to be transmitted external to the LAN. In this case, the security device may drop the packet as not being a TLS packet if the security device processes the packet using the TLS policy.

In some implementations, when processing the packet using the TLS policy, the security device may use a deep packet inspection technique to inspect the packet (e.g., to determine whether the packet includes a payload that is consistent with the TLS protocol, and/or the like) to determine whether the packet is a TLS packet. In this regard, by using the deep inspection technique, the security device may drop the packet as not being a TLS packet if the format or payload of the packet does not match the format or payload expected of TLS packets.

In some implementations, based on processing the packet, the security device may provide, to the client device, a notification indicating whether the packet has been transmitted or has been dropped. In this regard, the notification may indicate that the packet has been transmitted when the security device transmits the packet toward the remote device and/or receives, in response to transmitting the packet, VPN setup information (e.g., from the remote device). The notification may include the VPN setup information. The VPN setup information may include information that the client device may use to establish the VPN (e.g., IKE Security Associations (SAs)). In some implementations, the VPN setup information may be a response packet.

Alternatively, the notification may indicate that the packet has been dropped when the security device determines that the packet is to be dropped. In some implementations, the notification may include packet denial information providing a reason for the packet being dropped. For example, the packet denial information may indicate that the packet was dropped because the packet is not a TLS packet (e.g., the packet is not formatted in accordance with the TLS protocol, the packet includes a payload that is not consistent with the TLS protocol, and/or the like).

In this example, the security device may determine that the format of the packet (e.g., the format of the IKE packet) does not match the format of a TLS packet and, accordingly, may drop the packet.

As shown in FIG. 1A, and by reference number 110, the client device may determine that the packet has been dropped by the security device. For example, the client device (e.g., using the VPN application) may determine that the packet has been dropped if the client device does not receive a response to the packet after a threshold amount of time following transmission of the packet. The threshold amount may be preprogrammed with the client device, may be preprogrammed with the VPN application, may be based on user input, and/or the like. Additionally, or alternatively, the client device may determine that the packet has been dropped if the client device receives the notification including the packet denial information from the security device. For example, the packet denial information may indicate that the packet has been dropped because the packet is not a TLS packet.

Figure 1B:
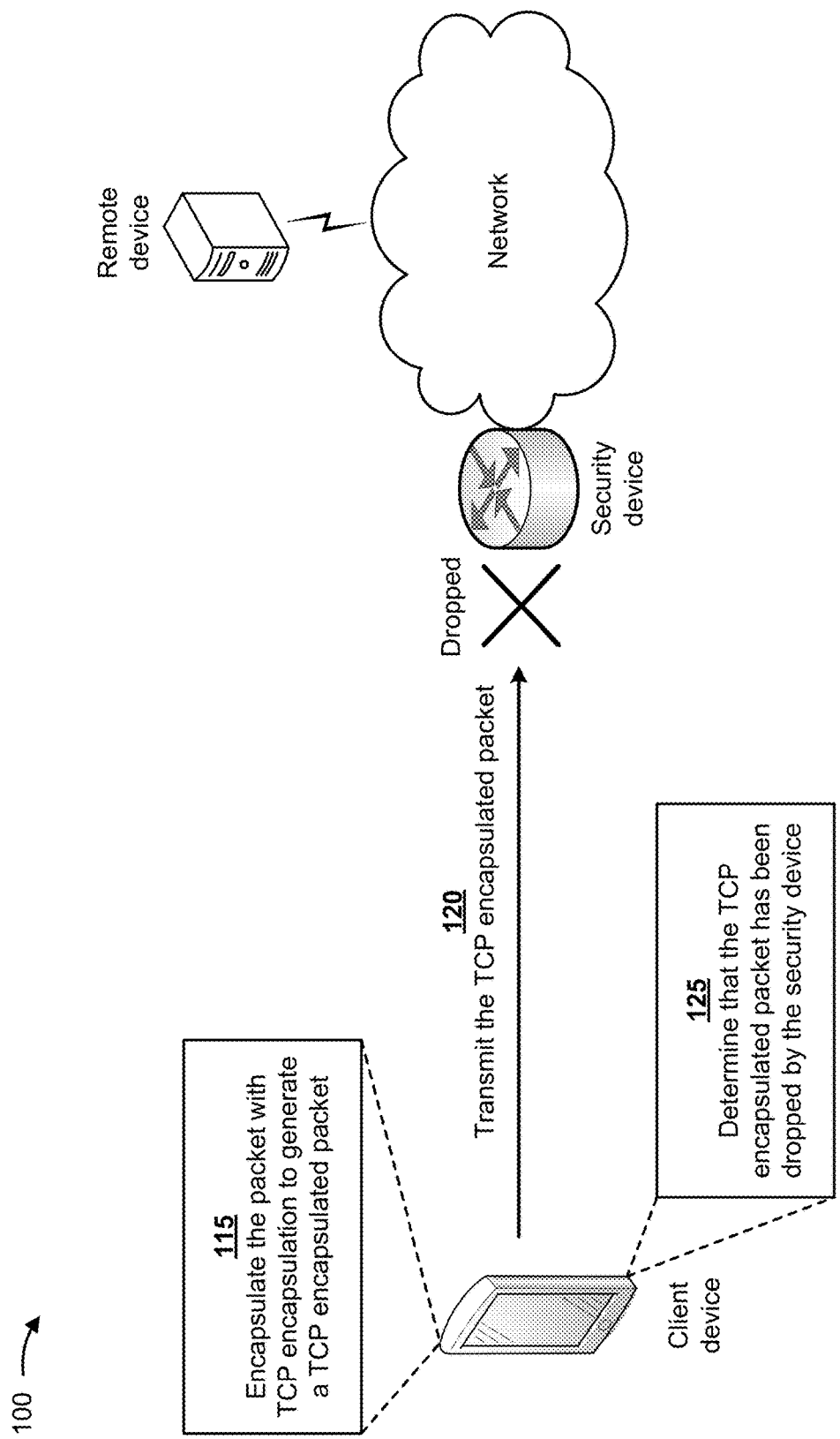

As shown in FIG. 1B, and by reference number 115, the client device may encapsulate the packet with TCP encapsulation to generate a TCP encapsulated packet. For example, based on determining that the packet has been dropped, the client device may encapsulate the packet to emulate a TLS packet, in an attempt to circumvent the security device (e.g., to circumvent the TLS policy). In this regard, in an attempt to circumvent the security device, the client device may encapsulate the packet with TCP encapsulation (e.g., with a TCP encapsulation technique) to generate a TCP encapsulated packet. For example, the client device may encapsulate the packet by adding a TCP header to the packet and include, in the TCP header, information identifying a particular destination port (to direct the packet to the particular destination port in an attempt to circumvent the security device). For example, the information identifying the particular destination port may identify port 443 (e.g., TCP destination port 443).

As shown in FIG. 1B, and by reference number 120, the client device may transmit the TCP encapsulated packet. The client device may transmit the TCP encapsulated packet directed to the particular destination port in an attempt to circumvent the security device. The TCP encapsulated packet may be routed to the security device and the security device may inspect and drop the TCP encapsulated packet, in a manner similar to the manner described above. For example, the security device may inspect the TCP encapsulated packet (e.g., using the deep packet inspection technique) to determine that the TCP encapsulated packet is an IKE packet encapsulated as a TLS packet (e.g., the format of the TCP encapsulated packet does not match the format of a TLS packet).

For instance, the security device, using the deep packet inspection, may determine that the packet includes a payload that is not consistent with the TLS protocol. Accordingly, the security device may determine that the TCP encapsulated packet is not a TLS packet and drop the TCP encapsulated packet. In some implementations, in addition to dropping the TCP encapsulated packet, the security device may send the notification.

As shown in FIG. 1B, and by reference number 125, the client device may determine that the TCP encapsulated packet has been dropped by the security device. The client device (e.g., using the VPN application) may determine that the TCP encapsulated packet has been dropped, in a manner similar to the manner described above.

Based on determining that the TCP encapsulated packet has been dropped, the client device may determine whether a version of the TLS protocol to be used by the client device supports null encryption. In some implementations, the client device may consider information from the client device (e.g., information from the VPN application) when determining which version of the TLS protocol to be used. Alternatively, or additionally, the client device may consider information from the security device and a server (e.g., associated with the remote device) when determining which version of the TLS protocol to be used.

If the client device determines that the version of TLS does not support the null encryption for TLS, the client device may determine to encrypt the packet using a combination of an encryption technique of the IKE protocol and a TLS encryption (e.g., an encryption technique of the TLS protocol) (as discussed below in connection with FIGS. 1C and 1E). Alternatively, if the client device determines that the version of TLS supports null encryption for TLS, the client device may determine to encrypt the packet using null encryption for TLS (as discussed below in connection with FIG. 1D).

Figure 1C:
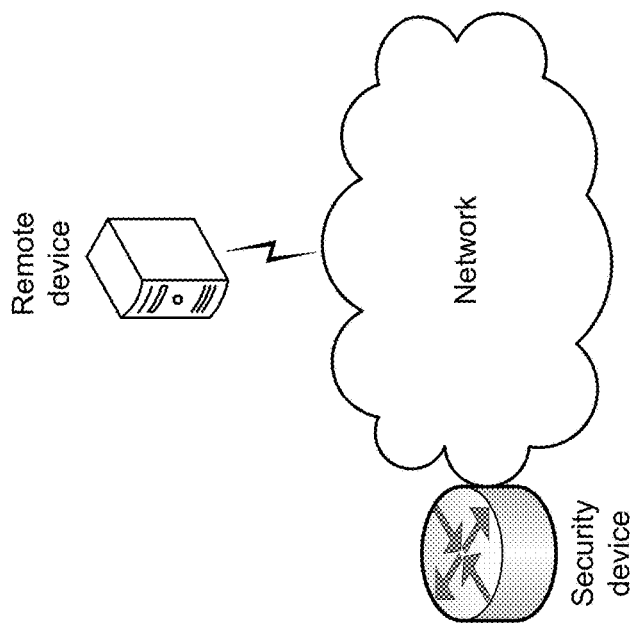
Figure 1C:
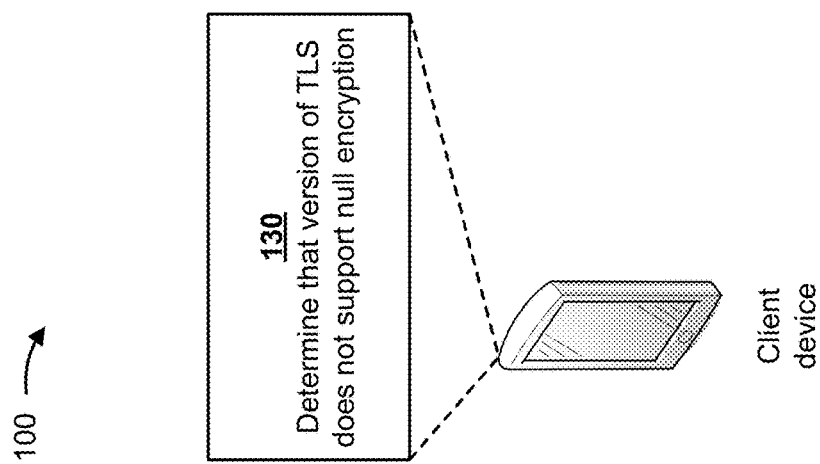

As shown in FIG. 1C, and by reference number 130, the client device may determine that the version of TLS does not support the null encryption for TLS. For example, the client device (e.g., using the VPN application) may determine that the version of TLS, to be used by the client device (e.g., used by the VPN application), is TLS protocol version 1.3, which does not support null encryption for TLS. Based on determining that the version of TLS does not support the null encryption for TLS, the client device (e.g., using the VPN application) may determine to encrypt the packet using a combination of the encryption technique of the IKE protocol (e.g., an encryption algorithm of IKE) and TLS encryption (as discussed below in connection with FIG. 1F). In some implementations, when the security device detects null encryption of the packet (e.g., a hello packet that is attempting to negotiate null encryption with the remote device), the security device may block a TLS connection negotiation associated with the packet encrypted using null encryption.

Figure 1D:
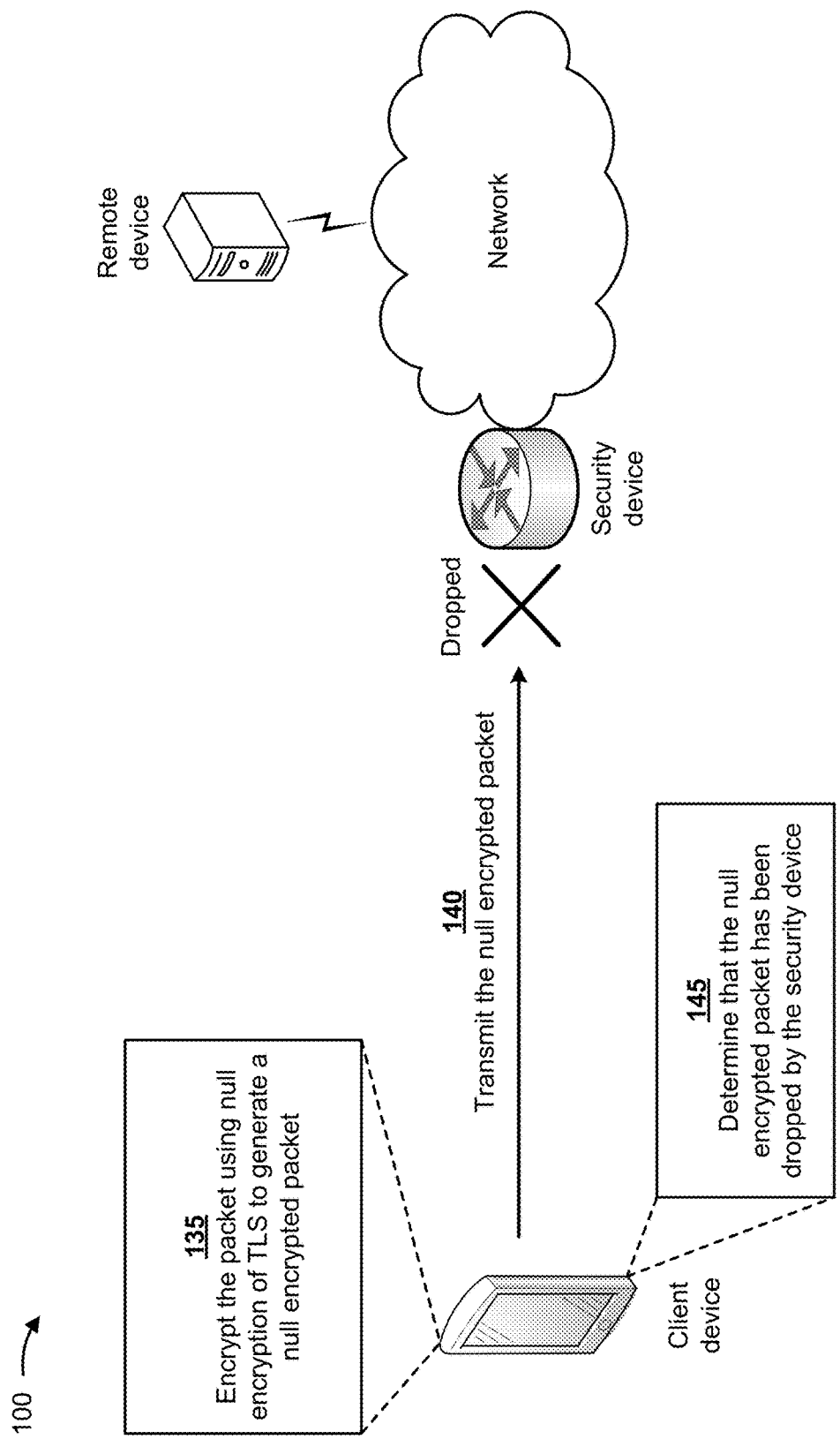

As shown in FIG. 1D, and by reference number 135, the client device may encrypt the packet using null encryption of TLS to generate a null encrypted packet. For example, the client device may determine that the version of TLS, to be used by the client device (e.g., used by the VPN application), is TLS protocol version 1.1 or version 1.2, which supports null encryption for TLS. Based on determining that the version of TLS supports null encryption for TLS, the client device (e.g., using the VPN application) may encrypt the packet using null encryption for TLS to generate the null encrypted packet. In some implementations, the packet may be encrypted using the encryption technique of the IKE protocol prior to being encrypted using null encryption for TLS. In some implementations, the client device may encapsulate the null encrypted packet in accordance with the TLS protocol to emulate the format of a TLS packet.

In some implementations, the null encrypted packet may be authenticated using an authentication algorithm of TLS and using an authentication algorithm associated with the IKE protocol (e.g., an authentication algorithm of IKE). In other words, in some implementations, the null encrypted packet may be subject to hashing of a hash algorithm associated the IKE protocol (e.g., a hash algorithm of IKE) in this situation.

As shown in FIG. 1D, and by reference number 140, the client device may transmit the null encrypted packet. For example, the client device may transmit the null encrypted packet to the remote device and the null encrypted packet may be routed to the security device, in a manner similar to the manner described above in connection with FIG. 1A (reference number 105). The client device may determine whether the null encrypted packet has been dropped by the security device.

If the security device determines that null encryption for TLS is supported (e.g., TLS protocol version 1.1 or version 1.2 is supported), the security device may transmit the null encrypted packet toward the remote device. In some implementations, the security device may receive the response packet from the remote device based on transmitting the null encrypted packet and may provide, to the client device, the response packet. The client device may receive the response packet transmitted by the remote device and determine that the null encrypted packet has not been dropped by the security device. The client device may establish the VPN based on receiving the response packet, as described in more detail below in connection with FIG. 1F (reference number 165).

The VPN may be established during a first phase (Phase 1) and a second phase (Phase 2) of the IKE protocol, as explained in more detail below in connection with FIG. 1F. After establishing the VPN, the client device may transmit packets, on the VPN, to communicate securely with the remote device. In some implementations, during Phase 2 of the IKE protocol discussed above, the client device and the remote device may select to communicate securely, on the VPN, using the ESP protocol and ESP packets.

Additionally, with respect to communicating securely using the ESP protocol, the client device and the remote device may negotiate encryption of the ESP packets, authentication of the ESP packets, and/or the like. With respect to encryption of the ESP packets, the client device and the remote device may negotiate to use null encryption of TLS. In some implementations, the ESP packets (e.g., a payload) may be encrypted using ESP encryption prior to being encrypted using null encryption of TLS.

With respect to authentication of the ESP packets, the client device and the remote device may negotiate to authenticate the ESP packets using an authentication algorithm of TLS without authenticating (e.g., hashing) the ESP packets using an authentication algorithm of ESP. The client device and the remote device may negotiate an authentication algorithm of TLS that is as strong as an authentication algorithm of ESP (e.g., associated with the client device and/or the remote device). In other words, in some implementations, the ESP packets may not be subject to hashing of a hash algorithm of IPSec (e.g., hash algorithm of ESP).

With respect to encryption algorithms for ESP, the client device and the remote device may negotiate to determine whether to use Data Encryption Standard (DES), Triple DES (3DES), Advanced Encryption Standard (AES), and/or the like. With respect to authentication algorithms for TLS, the client device and the remote device may negotiate to determine whether to use authenticated encryption with associated data (AEAD), hash-based message authentication code (HMAC), message digest 5 (MD5), secure hash algorithm (SHA), and/or the like. The above encryption and authentication algorithms are provided merely as examples of encryption and authentication algorithms that may be used. In practice, these and/or other encryption and authentication algorithms may be used.

As shown in FIG. 1D, and by reference number 145, the client device may determine that the null encrypted packet has been dropped by the security device. In this example, assume that the security device inspects and drops the null encrypted packet, in a manner similar to the manner described above in connection with FIG. 1A (reference number 110). In this instance, for example, the security device may determine that the null encrypted packet has been encrypted using null encryption for TLS and determine, by performing deep packet inspection, that the null encrypted packet includes a payload that is not consistent with the TLS protocol. Accordingly, the security device may determine that the null encrypted packet is not a TLS packet and drop the null encrypted packet. In some implementations, if the security device allows transmission of the null encrypted packet (e.g., to negotiate and establish a TLS connection with null encryption with the remote device), the security device may block subsequent data packets (transmitted by the client device toward the remote device) that are encrypted using null encryption of TLS.

Alternatively, the security device may determine that that the version of TLS is TLS protocol version 1.3, which does not support null encryption for TLS. Accordingly, the security device may determine that the null encrypted packet is not supported and drop the null encrypted packet. The client device may determine that the null encrypted packet has been dropped, in a manner similar to the manner described above in connection with FIG. 1A (reference number 110).

Figure 1E:
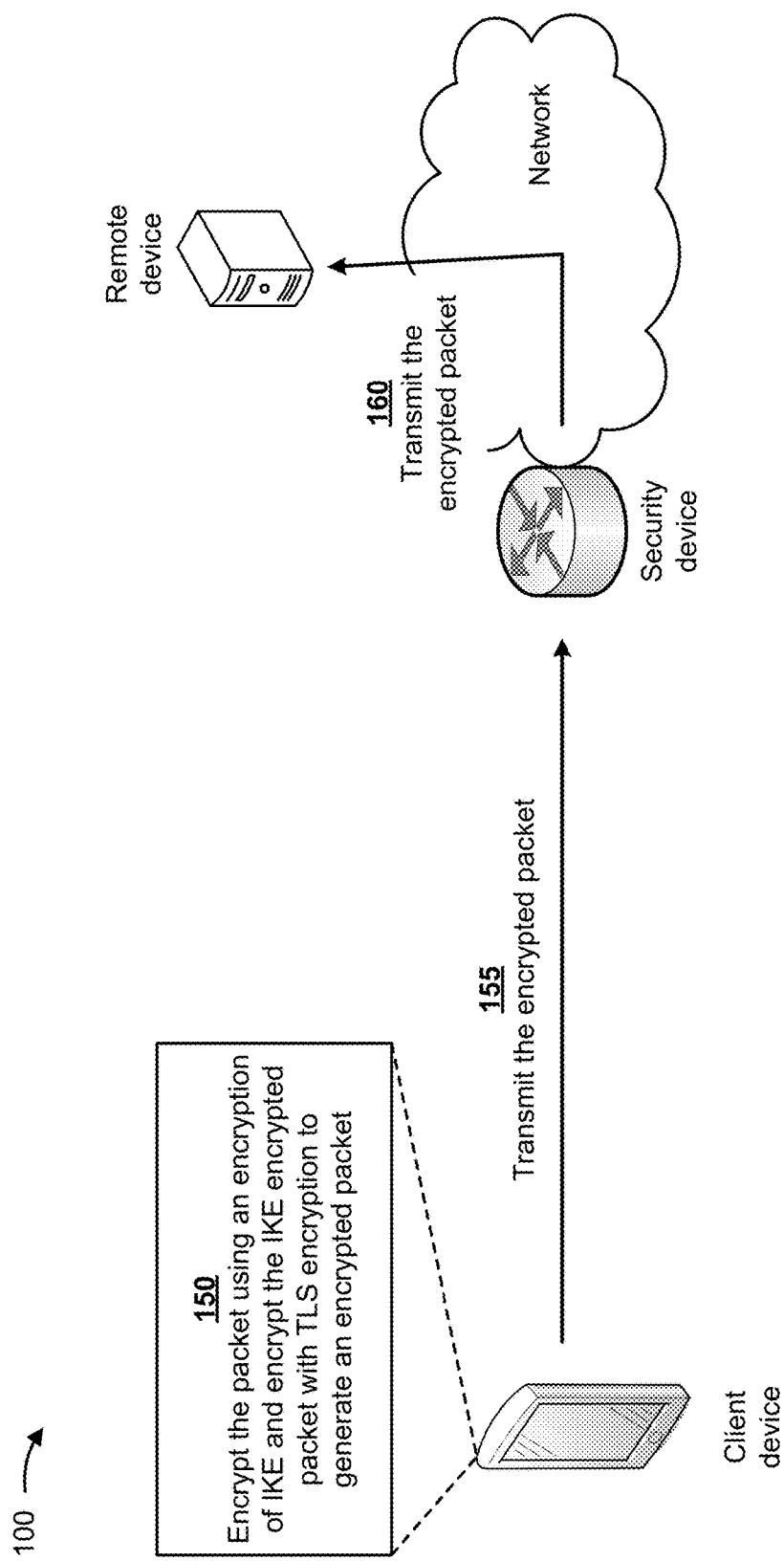

As shown in FIG. 1E, and by reference number 150, the client device may encrypt the packet using an encryption of IKE and encrypt the IKE encrypted packet with TLS encryption to generate an encrypted packet. Based on determining that the null encrypted packet has been dropped, the client device (e.g., using the VPN application) may encrypt the packet using an encryption technique of the IKE protocol (e.g., an encryption algorithm of IKE) and a TLS encryption (e.g., an encryption technique of the TLS protocol), in an attempt to ensure compliance with the TLS policy and, thereby, to ensure transmission of the packet toward the remote device. For example, the client device (e.g., using the VPN application) may encrypt the packet using the encryption technique of the IKE protocol to form an IKE encrypted packet.

The client device may further encrypt the IKE encrypted packet using the TLS encryption to generate a TLS encrypted packet. In this regard, encrypting the packet may prevent the security device from inspecting the packet using the deep packet inspection technique to determine that the packet includes a payload that is inconsistent with the TLS protocol. The TLS encryption (e.g., the encryption algorithm for the TLS) may be an encryption that is at least as strong as an encryption algorithm of IKE and/or ESP. In some implementations, the client device may encapsulate the TLS encrypted packet in accordance with the TLS protocol to emulate the format of a TLS packet.

As shown in FIG. 1E, and by reference number 155, the client device may transmit the TLS encrypted packet. The client device may transmit the TLS encrypted packet toward the remote device. The TLS encrypted packet may be routed to the security device and the security device may inspect and forward the TLS encrypted packet, in a manner similar to the manner described above.

As shown in FIG. 1E, and by reference number 160, the security device may transmit the encrypted packet. In this instance, the security device may determine that the format of the TLS encrypted packet matches the format of a TLS packet (e.g., based on the IKE encrypted packet being encrypted using the TLS encryption and being encapsulated in accordance with the TLS protocol). Additionally, or alternatively, encrypting the packet may prevent the security device from determining, using the deep packet inspection technique, that the packet is not a TLS packet, as explained above. Accordingly, the security device may transmit the TLS encrypted packet toward the remote device. In some implementations, the security device may receive the response packet from the remote device and may provide, to the client device, the response packet.

Figure 1F:
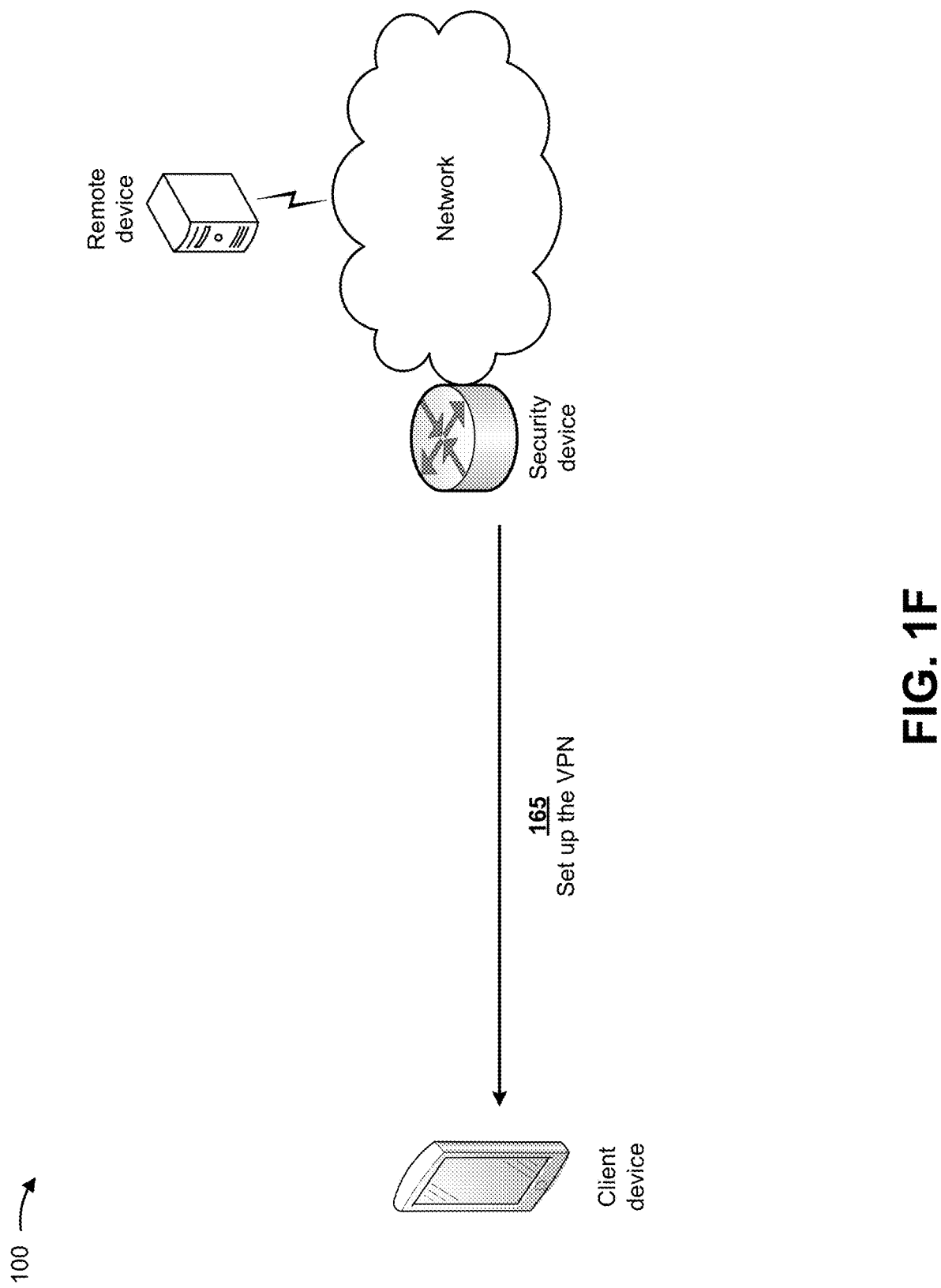

As shown in FIG. 1F, and by reference number 165, the client device may set up the VPN. For example, the client device may receive the response packet transmitted by the remote device and may establish the VPN based on receiving the response packet. For instance, the client device (e.g., using the VPN application) may establish the VPN (that uses IPsec SA, as explained above) based on, for example, the VPN setup information. As an example, the IKE protocol may be used to establish an encrypted communication session between the client device and the remote device. The IKE protocol may include two phases. In a first phase (Phase 1), the client device and the remote device may negotiate an SA (e.g., associated with an IKE tunnel) for the encrypted communication session. The SA negotiated from Phase 1 enables the client device and/or the other device to communicate securely in a second phase (Phase 2). During Phase 2 of the IKE protocol, the client device and the remote device may establish SAs for other applications, such as IPsec.

The IKE protocol may establish an IPsec SA by establishing a shared state between the client device and the remote device. The shared state defines specific services provided to network traffic, which cryptographic models will be utilized to provide the specific services, keys utilized as input to the cryptographic models, parameters for communication of the network traffic, and/or the like. The IKE protocol may perform a mutual authentication between the client device and the remote device, and may establish an IPsec SA that includes shared secret information that can be used to efficiently establish SAs for the ESP protocol or an authentication header (AH) protocol and a set of cryptographic models to be used by the SAs to protect network traffic carried by the IPsec SA.

After establishing the VPN, the client device may transmit the packet, on the VPN, to communicate securely with the remote device. In some implementations, during Phase 2 of the IKE protocol discussed above, the client device and the remote device may select to communicate securely, on the VPN, using the ESP protocol and ESP packets.

Additionally, with respect to communicating securely using the ESP protocol, the client device and the remote device may negotiate encryption of ESP packets, authentication of ESP packets, and/or the like. With respect to encryption of the ESP packets, the client device and the remote may negotiate to encrypt the ESP packets using null encryption for ESP and encrypt the null encrypted ESP packets with TLS encryption. With respect to authentication of the ESP packets, the client device and the remote device may negotiate to authenticate the ESP packets using an authentication algorithm of ESP and using an authentication algorithm of TLS. TLS uses encryption algorithm which is as strong as or stronger than the encryption algorithm that would have been used by ESP if the security device were to not block the IKE/ESP traffic (e.g., IKE and ESP packets).

With respect to authentication algorithms for ESP, the client device and the remote device may negotiate to determine whether to use message digest 5 (MD5), secure hash algorithm (SHA), and/or the like. With respect to encryption algorithms for TLS, the client device and the remote device may negotiate to determine whether to use AES, Galois/Counter Mode (GCM), cipher block chaining (CBC), and/or the like. With respect to authentication algorithms for TLS, the client device and the remote device may negotiate to determine whether to use authenticated encryption with associated data (AEAD), hash-based message authentication code (HMAC), MD5, SHA, and/or the like. The above encryption and authentication algorithms are provided merely as examples of encryption and authentication algorithms that may be used. In practice, these and/or other encryption and authentication algorithms may be used.

In some implementations, the client device may configured (e.g., using the VPN application) to determine an order in which techniques used by the client device to transmit a packet (e.g., an IKE packet) will be attempted (e.g., IKE packet, TCP encapsulated IKE packet, null encrypted IKE packet, TLS encrypted IKE packet, and/or the like). If a first technique fails (e.g., the IKE packet is dropped by the security device), then the client device may attempt a second technique; if the second technique fails (e.g., the TCP encapsulated IKE packet is dropped by the security device), then the client device may attempt a third technique; and so on. In some implementations, the client device (e.g., using the VPN application) may be configured to encrypt the packet using TLS encryption if the IKE packet, the TCP encapsulated IKE packet, and the null encrypted IKE packet are dropped by the security device.

In the description above, it has been assumed that the security device drops the packet (FIG. 1A), the TCP encapsulated packet (FIG. 1B), and the null encrypted packet (FIG. 1D). In some implementations, the security device may permit the packet (from FIG. 1A), the TCP encapsulated packet (from FIG. 1B), or the null encrypted packet (from FIG. 1D) to be transmitted toward the remote device.

In the case of the packet (from FIG. 1A), the remote device may process the packet and respond if necessary. In the case of the TCP encapsulated packet (from FIG. 1B), the remote device may remove the TCP encapsulation, process the packet, and respond if necessary. In the case of the null encrypted packet (from FIG. 1C), the remote device may decrypt the encrypted packet, process the packet, and respond if necessary.

As indicated above, FIGS. 1A-1F are provided merely as one or more examples. Other examples may differ from what is described with regard to FIGS. 1A-1F. The number and arrangement of devices and/or networks shown in FIGS. 1A-1F are provided as one or more examples. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
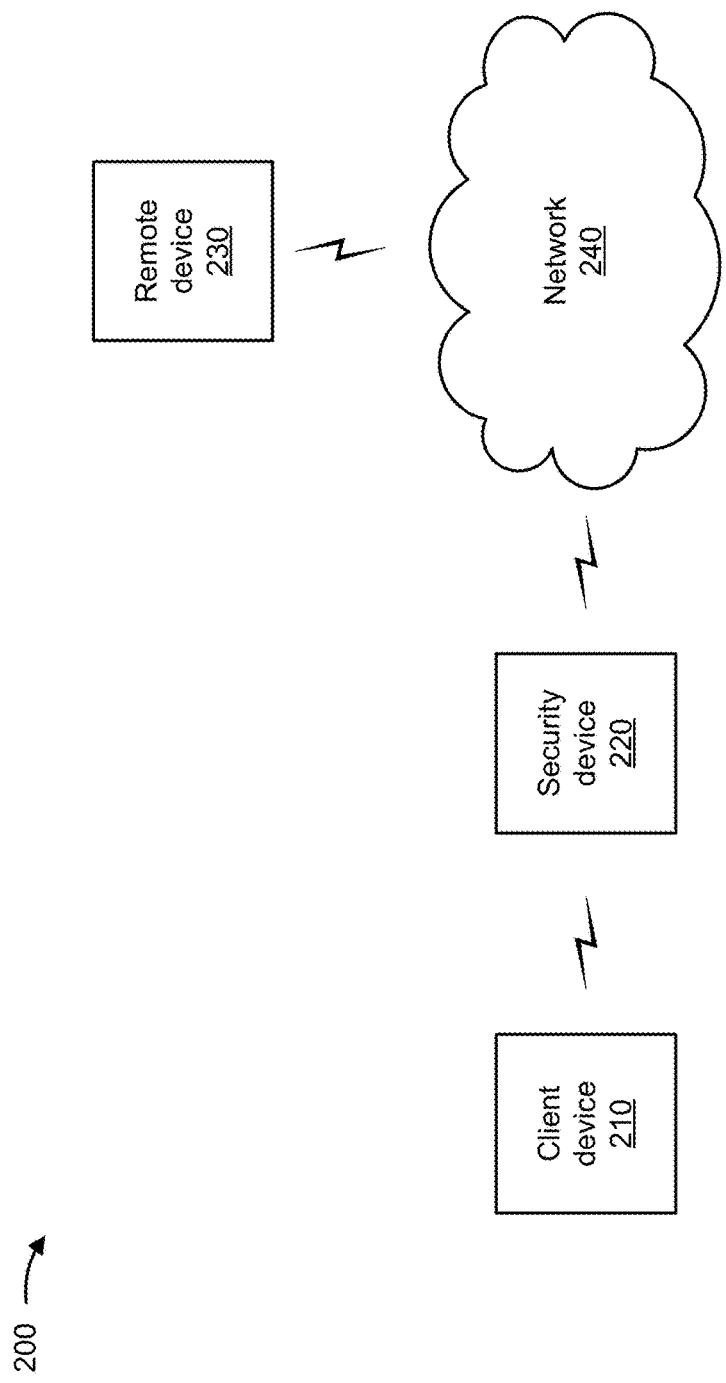
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a security device 220, a remote device 230, and a network 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, client device 210 may receive network traffic from and/or may provide network traffic to remote device 230 via network 240 (e.g., by routing packets using security device 220 as an intermediary).

Security device 220 includes one or more devices capable of receiving, processing, storing, routing, and/or providing traffic (e.g., a packet, other information or metadata, and/or the like) in a manner described herein. For example, security device 220 may include a firewall or another type of device that includes security-related functionality, such as a router (e.g., a label switching router (LSR), a label edge router (LER), an ingress router, an egress router, a provider router (e.g., a provider edge router, a provider core router, and/or the like), a virtual router, and/or the like), a gateway, a switch, a hub, a bridge, a reverse proxy, a server (e.g., a proxy server, a cloud server, a data center server, and/or the like), a load balancer, and/or a similar device. In some implementations, security device 220 may be a physical device implemented within a housing, such as a chassis. In some implementations, security device 220 may be a virtual device implemented by one or more computer devices of a cloud computing environment or a data center.

Remote device 230 includes one or more devices capable of receiving, generating, storing, processing, and/or providing information, such as information described herein. For example, remote device 230 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a server device, a network device, or a similar type of device. In some implementations, remote device 230 may receive network traffic from and/or may provide network traffic to client device 210 via network 240 (e.g., by routing packets via security device 220 as an intermediary).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
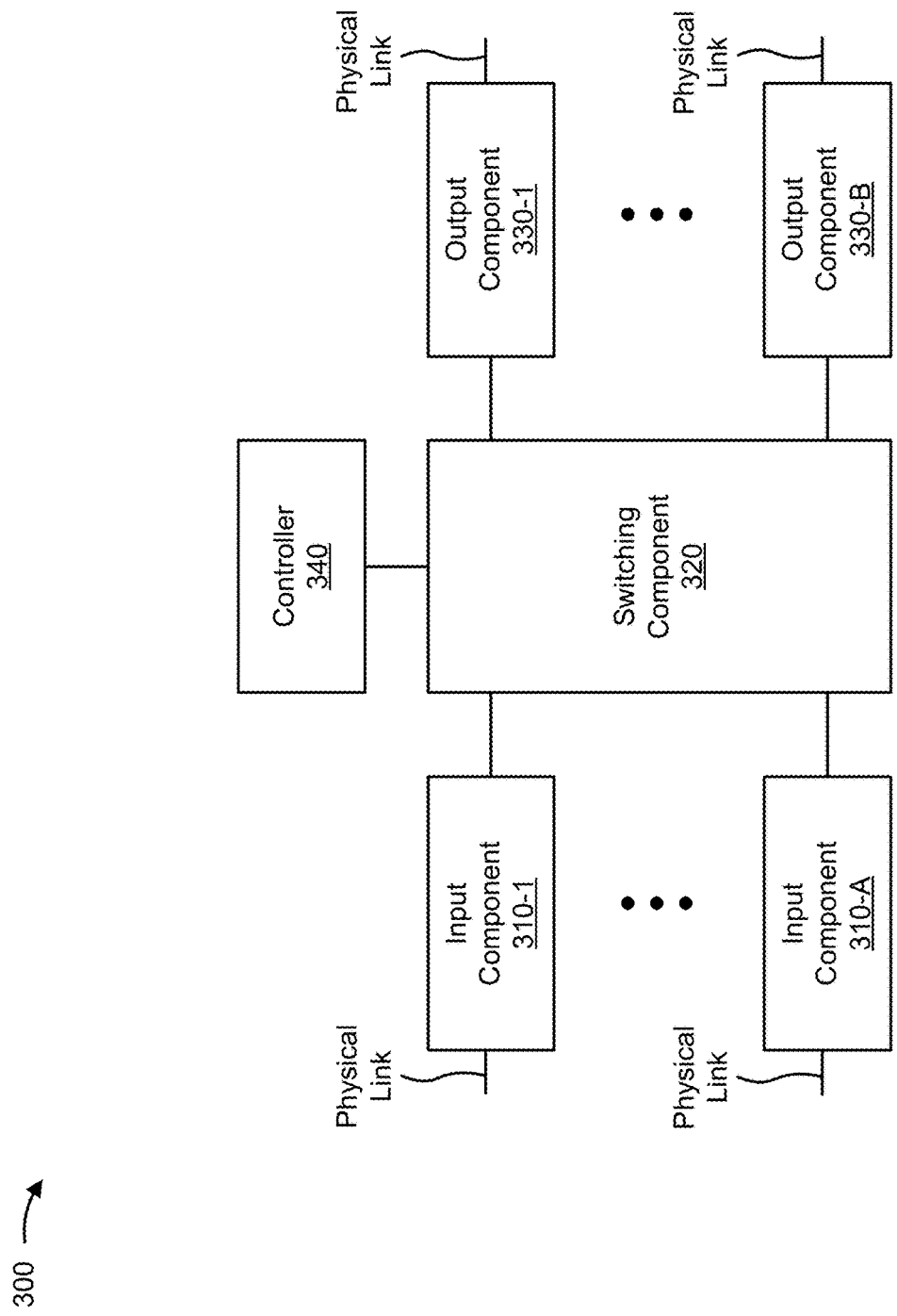
FIG. 3 is a diagram of example components of a device of FIG. 2.

FIG. 3 is a diagram of example components of a device 300 of FIG. 2. Device 300 may correspond to client device 210, security device 220, and/or remote device 230. In some implementations, client device 210, security device 220, and/or remote device 230 may include one or more devices 300 and/or one or more components of device 300. As shown in FIG. 3, device 300 may include one or more input components 310-1 through 310-A (A≥1) (hereinafter referred to collectively as input components 310, and individually as input component 310), a switching component 320, one or more output components 330-1 through 330-B (B≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 340 may include one or more processors that can be programmed to perform a function.

In some implementations, controller 340 may include a random access memory (RAM), a read only memory (ROM), and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
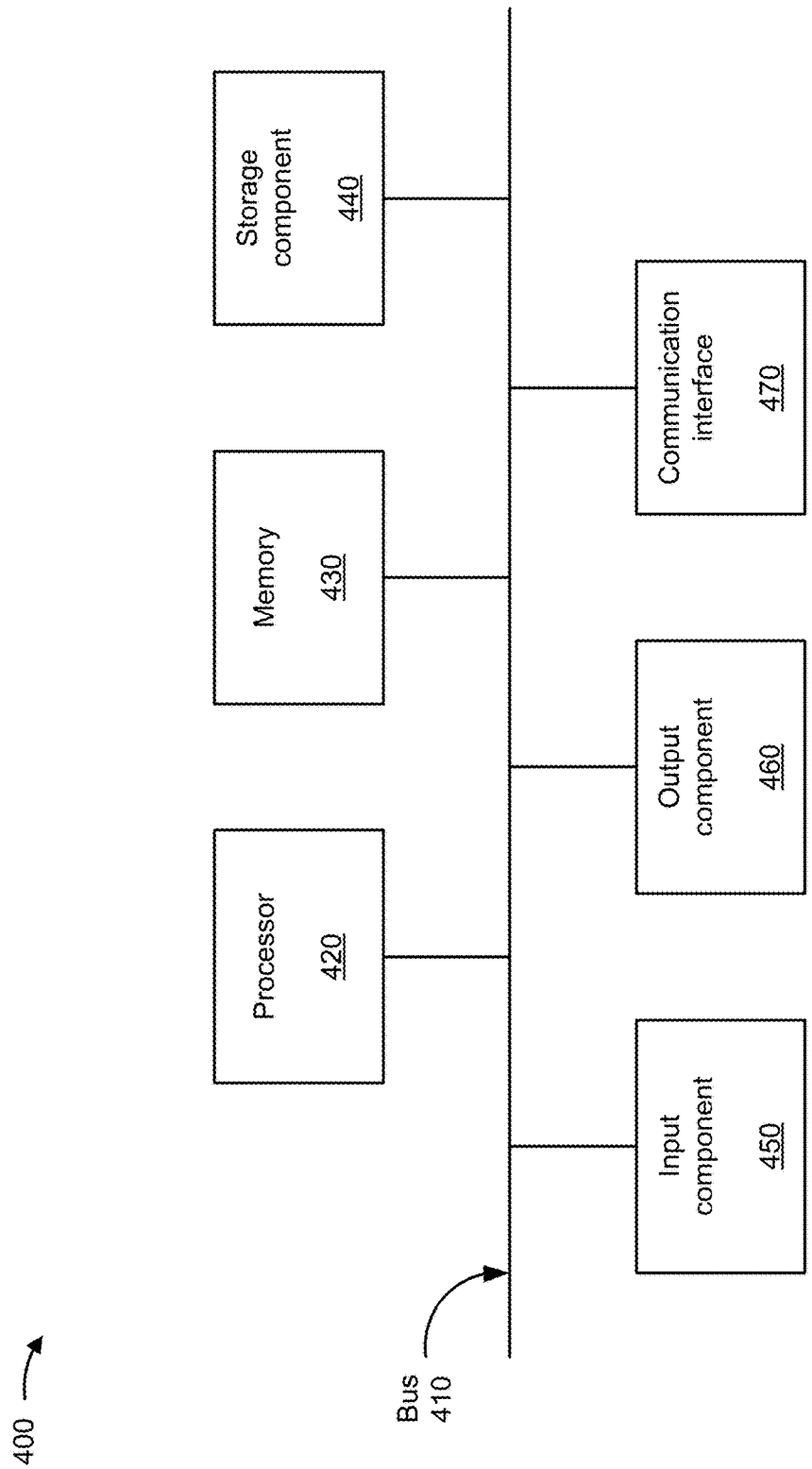
FIG. 4 is a diagram of example components of one or more devices of FIG. 2.

FIG. 4 is a diagram of example components of one or more devices 400 of FIG. 2. Device 400 may correspond to client device 210, security device 220, and/or remote device 230. In some implementations, client device 210, security device 220, and/or remote device 230 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a CPU, a GPU, an APU, a microprocessor, a microcontroller, a DSP, an FPGA, an ASIC, or another type of processing component. In some implementations, processor 420 includes one or more processors capable of being programmed to perform a function. Memory 430 includes a RAM, a ROM, and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
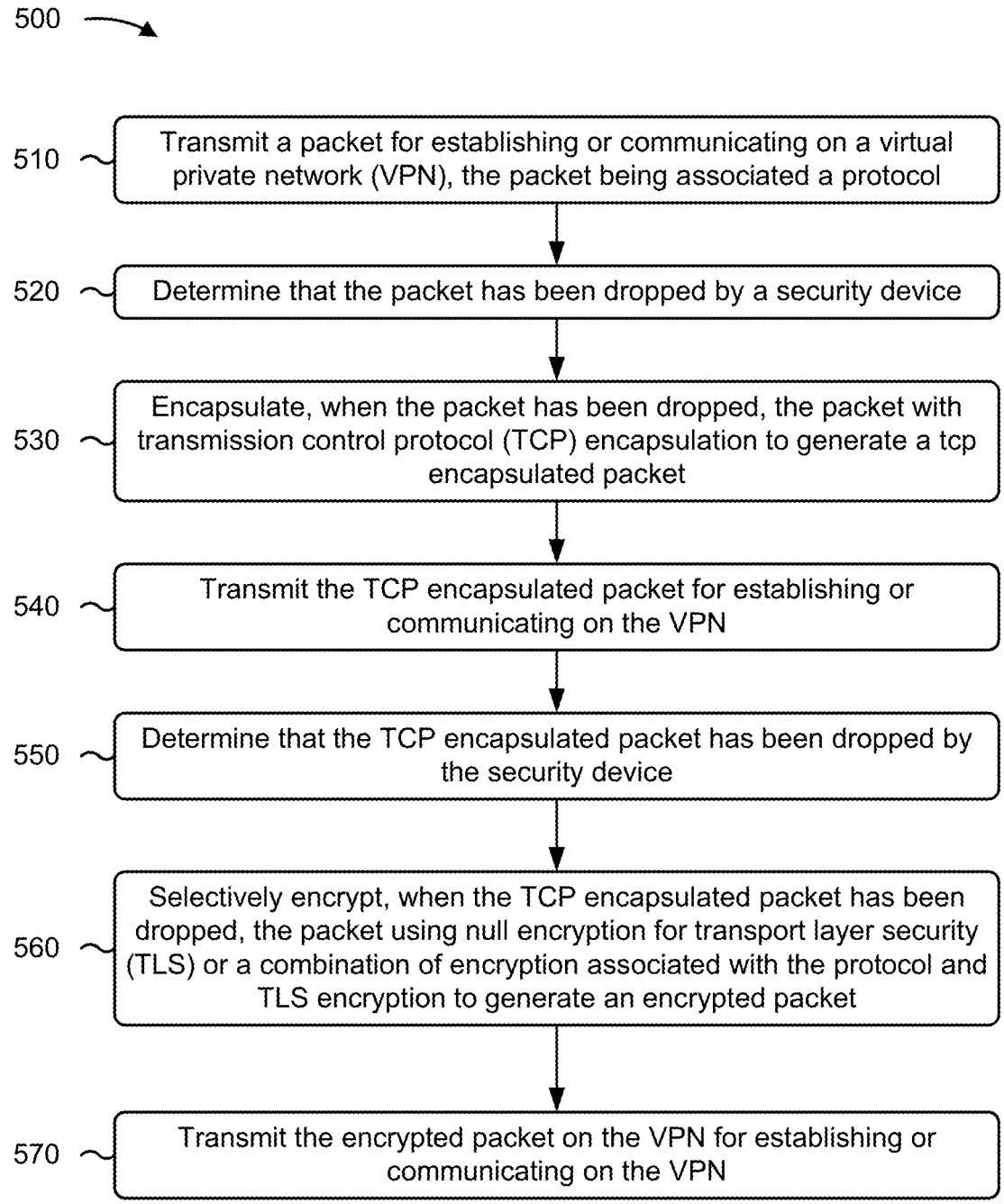
FIGS. 5-7 are flow charts of example processes relating to selectively encrypting a packet using transport layer security encryption.

FIG. 5 is a flow chart of an example process 500 associated with selective transport layer security encryption. In some implementations, one or more process blocks of FIG. 5 may be performed by a device (e.g., client device 210). In some implementations, one or more process blocks of FIG. 5 may be performed by another device or a group of devices separate from or including the device, such as a security device (e.g., security device 220), a remote device (e.g., remote device 230), and/or the like. Additionally, or alternatively, one or more process blocks of FIG. 5 may be performed by one or more components of a device 300, such as input components 310, switching component 320, output components 330, one or more components of a device 400, such as processor 420, memory 430, storage component 440, input component 450, output component 460, communication interface 470, and/or the like.

As shown in FIG. 5, process 500 may include transmitting a packet for establishing or communicating on a virtual private network (VPN) (block 510). For example, the device may transmit a packet for establishing or communicating on a virtual private network (VPN), as described above.

As further shown in FIG. 5, process 500 may include determining that the packet has been dropped by a security device (block 520). For example, the device may determine that the packet has been dropped by a security device, as described above.

As further shown in FIG. 5, process 500 may include encapsulating, when the packet has been dropped, the packet with transmission control protocol (TCP) encapsulation to generate a TCP encapsulated packet (block 530). For example, the device may encapsulate, when the packet has been dropped, the packet with transmission control protocol (TCP) encapsulation to generate a TCP encapsulated packet, as described above.

As further shown in FIG. 5, process 500 may include transmitting the TCP encapsulated packet for establishing or communicating on the VPN (block 540). For example, the device may transmit the TCP encapsulated packet for establishing or communicating on the VPN, as described above.

As further shown in FIG. 5, process 500 may include determining that the TCP encapsulated packet has been dropped by the security device (block 550). For example, the device may determine that the TCP encapsulated packet has been dropped by the security device, as described above.

As further shown in FIG. 5, process 500 may include selectively encrypting, when the TCP encapsulated packet has been dropped, the packet using a combination of encryption associated with the protocol and null encryption for transport layer security (TLS) or a combination of encryption associated with the protocol and TLS encryption to generate an encrypted packet (block 560). For example, the device may selectively encrypt, by the device and when the TCP encapsulated packet has been dropped, the packet using a combination of encryption associated with the protocol and null encryption for transport layer security (TLS) or a combination of encryption associated with the protocol and TLS encryption to generate an encrypted packet, as described above.

As further shown in FIG. 5, process 500 may include transmitting the encrypted packet on the VPN for establishing or communicating on the VPN (block 570). For example, the device may transmit the encrypted packet on the VPN for establishing or communicating on the VPN, as described above.

Process 500 may include additional implementations, such as any single implementation or any combination of implementations described below and/or in connection with one or more other processes described elsewhere herein.

In a first implementation, at least one of the packet, the TCP encapsulated packet, or the encrypted packet is directed to destination port 443. In a second implementation, alone or in combination with the first implementation, selectively encrypting the packet using the null encryption for TLS or the combination of encryption associated with the protocol and TLS encryption includes: encrypting the packet using the null encryption for TLS based on determining that the version of TLS to be used supports null encryption to generate the encrypted packet. In a third implementation, alone or in combination with one or more of the first and second implementations, selectively encrypting the packet using the null encryption for TLS or the combination of encryption associated with the protocol and TLS encryption includes: encrypting the packet using the combination of encryption associated with the protocol and TLS encryption based on determining that the version of TLS to be used does not support null encryption to generate the encrypted packet.

In a fourth implementation, alone or in combination with one or more of the first through third implementations, selectively encrypting the packet using the null encryption for TLS or the combination of encryption associated with the protocol and TLS encryption includes encrypting the packet using the null encryption for TLS to form a first encrypted packet, and the method further comprises: transmitting the first encrypted packet; determining that the first encrypted packet has been dropped by the security device, and encrypting, when the first encrypted packet has been dropped, the packet using the combination of encryption associated with the protocol and TLS encryption to generate a second encrypted packet, the second encrypted packet is the encrypted packet.

In a fifth implementation, alone or in combination with one or more of the first through fourth implementations, selectively encrypting the packet using the null encryption for TLS or the combination of encryption associated with the protocol and TLS encryption includes encrypting the packet using the null encryption for TLS, and the method further comprises: subjecting the packet to hashing of a hash algorithm of TLS and subjecting the packet to hashing of a hash algorithm associated with the protocol.

In a sixth implementation, alone or in combination with one or more of the first through fifth implementations, selectively encrypting the packet using the null encryption for TLS or the combination of encryption associated with the protocol and TLS encryption includes encrypting the packet using the combination of encryption associated with the protocol and TLS encryption, and the method further comprises: subjecting the packet to hashing of a hash algorithm of TLS and subjecting the packet to hashing of a hash algorithm associated with the protocol.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
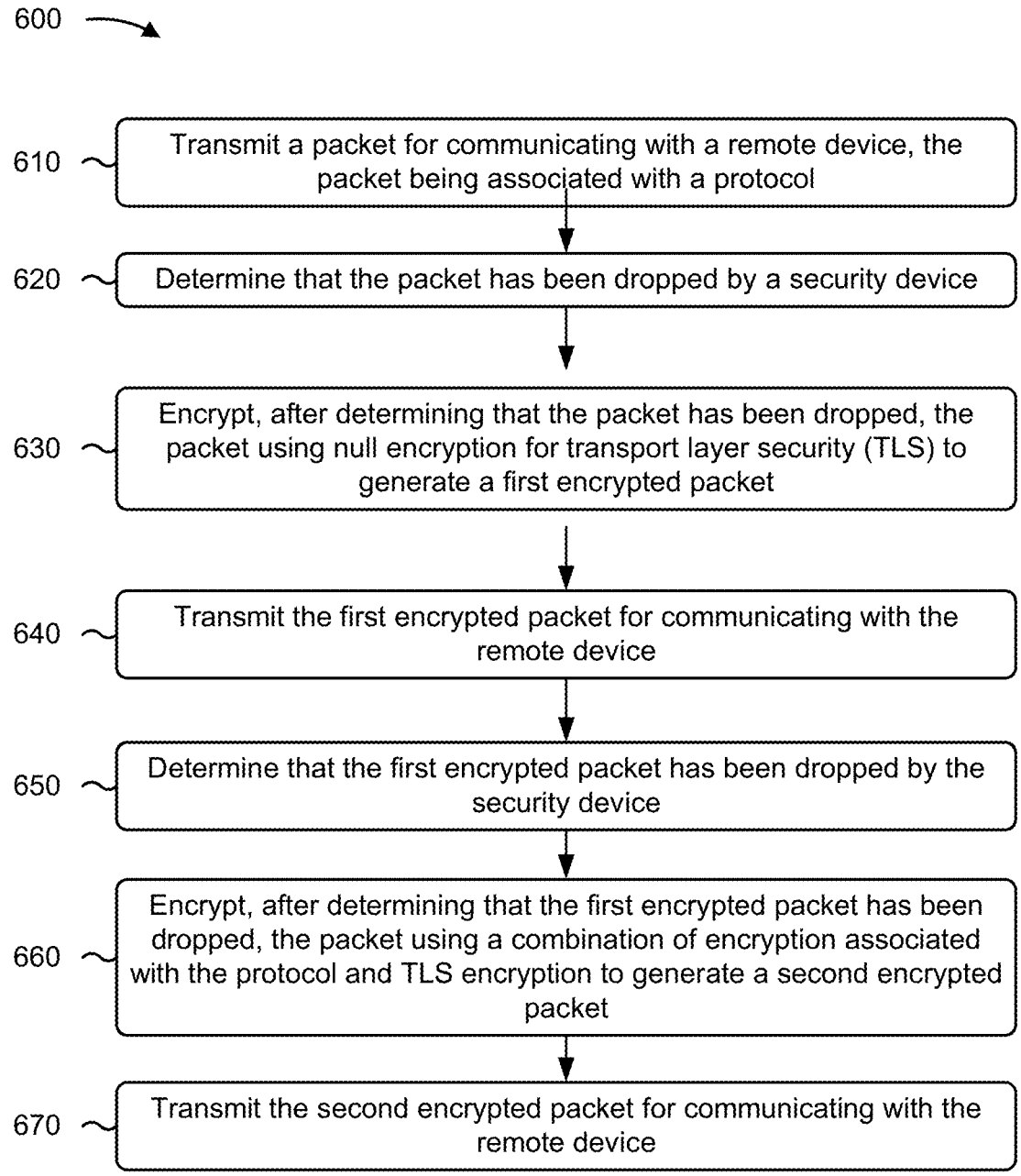

FIG. 6 is a flow chart of an example process 600 associated with selective transport layer security encryption. In some implementations, one or more process blocks of FIG. 6 may be performed by a device (e.g., client device 210). In some implementations, one or more process blocks of FIG. 6 may be performed by another device or a group of devices separate from or including the device, such as a security device (e.g., security device 220), a remote device (e.g., remote device 230), and/or the like. Additionally, or alternatively, one or more process blocks of FIG. 6 may be performed by one or more components of a device 300, such as input components 310, switching component 320, output components 330, one or more components of a device 400, such as processor 420, memory 430, storage component 440, input component 450, output component 460, communication interface 470, and/or the like.

As shown in FIG. 6, process 600 may include transmitting a packet for communicating with a remote device (block 610). For example, the device may transmit a packet for communicating with a remote device, as described above.

As further shown in FIG. 6, process 600 may include determining that the packet has been dropped by a security device (block 620). For example, the device may determine that the packet has been dropped by a security device, as described above.

As further shown in FIG. 6, process 600 may include encrypt, after determining that the packet has been dropped, the packet using a combination of encryption associated with the protocol and null encryption for transport layer security (TLS) to generate a first encrypted packet (block 630). For example, the device may encrypt, after determining that the packet has been dropped, the packet using a combination of encryption associated with the protocol and null encryption for transport layer security (TLS) to generate a first encrypted packet, as described above.

As further shown in FIG. 6, process 600 may include transmitting the first encrypted packet for communicating with the remote device (block 640). For example, the device may transmit the first encrypted packet for communicating with the remote device, as described above.

As further shown in FIG. 6, process 600 may include determining that the first encrypted packet has been dropped by the security device (block 650). For example, the device may determine that the first encrypted packet has been dropped by the security device, as described above.

As further shown in FIG. 6, process 600 may include encrypt, after determining that the first encrypted packet has been dropped, the packet using a combination of encryption associated with the protocol and TLS encryption to generate a second encrypted packet (block 660). For example, the device may encrypt, after determining that the first encrypted packet has been dropped, the packet using a combination of encryption associated with the protocol and TLS encryption to generate a second encrypted packet, as described above.

As further shown in FIG. 6, process 600 may include transmitting the second encrypted packet for communicating with the remote device (block 670). For example, the device may transmit the second encrypted packet for communicating with the remote device, as described above.

Process 600 may include additional implementations, such as any single implementation or any combination of implementations described below and/or in connection with one or more other processes described elsewhere herein.

In a first implementation, process 600 includes selecting an encryption algorithm for the TLS encryption that is at least as strong as an encryption algorithm associated with the protocol; and encrypt the packet is using the combination of encryption associated with the protocol and the encryption algorithm for the TLS encryption. In a second implementation, alone or in combination with the first implementation, process 600 includes transmitting an Internet key exchange (IKE) packet as part of an IKE procedure to establish a virtual private network (VPN) tunnel with the remote device; determining that the IKE packet has been dropped by the security device; encapsulating, when the IKE packet has been dropped, the packet with TCP encapsulation to generate a TCP encapsulated IKE packet; and transmitting the TCP encapsulated IKE packet for establishing the VPN tunnel.

In a third implementation, alone or in combination with one or more of the first and second implementations, the TCP encapsulated IKE packet is directed to destination port 443. In a fourth implementation, alone or in combination with one or more of the first through third implementations, process 600 includes determining that the TCP encapsulated IKE packet has been dropped by the security device; encrypt, when the TCP is encapsulating IKE packet has been dropped, the IKE packet using a combination of IKE encryption and transport layer security (TLS) encryption to generate an encrypted IKE packet; and transmitting the encrypted IKE packet for establishing the VPN tunnel.

In a fifth implementation, alone or in combination with one or more of the first through fourth implementations, process 600 includes determining that the packet has been dropped by the security device based on receiving no reply to the packet from the security device for a threshold amount of time, or determining that the packet has been dropped by the security device based on receiving a notification from the security device indicating that the packet has been dropped. In a sixth implementation, alone or in combination with one or more of the first through fifth implementations, process 600 includes encapsulating, based on determining that the packet has been dropped, the packet with transmission control protocol (TCP) encapsulation to generate a TCP encapsulated packet; and transmitting the TCP encapsulated packet for communicating with the remote device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
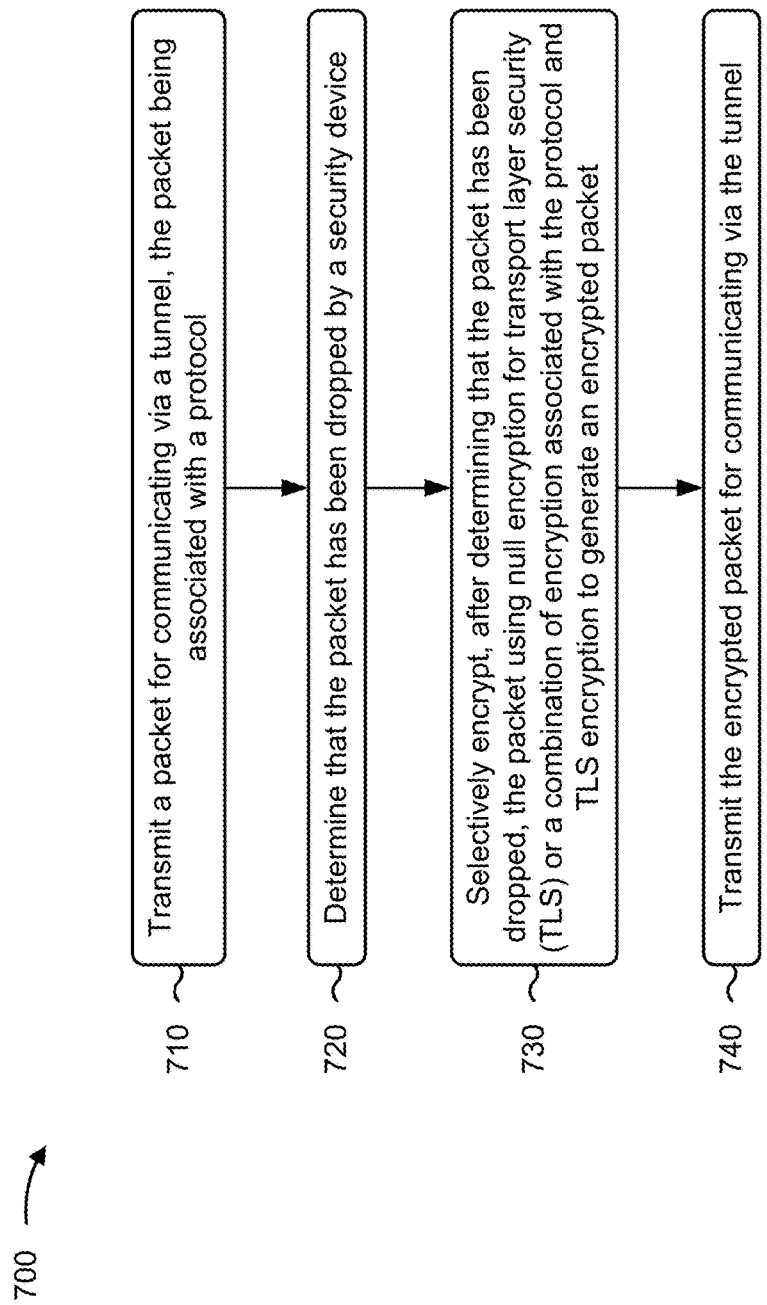

FIG. 7 is a flow chart of an example process 700 associated with selective transport layer security encryption. In some implementations, one or more process blocks of FIG. 7 may be performed by a device (e.g., client device 210). In some implementations, one or more process blocks of FIG. 7 may be performed by another device or a group of devices separate from or including the device, such as a security device (e.g., security device 220), a remote device (e.g., remote device 230), and/or the like. Additionally, or alternatively, one or more process blocks of FIG. 7 may be performed by one or more components of a device 300, such as input components 310, switching component 320, output components 330, one or more components of a device 400, such as processor 420, memory 430, storage component 440, input component 450, output component 460, communication interface 470, and/or the like.

As shown in FIG. 7, process 700 may include transmitting a packet for communicating via a tunnel (block 710). For example, the device may transmit a packet for communicating via a tunnel, as described above.

As further shown in FIG. 7, process 700 may include determining that the packet has been dropped by a security device (block 720). For example, the device may determine that the packet has been dropped by a security device, as described above.

As further shown in FIG. 7, process 700 may include selectively encrypt, after determining that the packet has been dropped, the packet using a combination of encryption associated with the protocol and null encryption for transport layer security (TLS) or a combination of encryption associated with the protocol and TLS encryption to generate an encrypted packet (block 730). For example, the device may selectively encrypt, after determining that the packet has been dropped, the packet using a combination of encryption associated with the protocol and null encryption for transport layer security (TLS) or a combination of encryption associated with the protocol and TLS encryption to generate an encrypted packet, as described above.

As further shown in FIG. 7, process 700 may include transmitting the encrypted packet for communicating via the tunnel (block 740). For example, the device may transmit the encrypted packet for communicating via the tunnel, as described above.

Process 700 may include additional implementations, such as any single implementation or any combination of implementations described below and/or in connection with one or more other processes described elsewhere herein.

In a first implementation, the one or more instructions, when executed by the one or more processors, further cause the one or more processors to determine that a version of TLS to be used supports null encryption, and encrypt the packet using the null encryption for TLS based on determining that the version of TLS to be used supports null encryption to generate the encrypted packet.

In a second implementation, alone or in combination with the first implementation, the one or more instructions, when executed by the one or more processors, further cause the one or more processors to determine that a version of TLS to be used does not support null encryption, and encrypt the packet using the combination of encryption associated with the protocol and TLS encryption based on determining that the version of TLS to be used does not support null encryption to generate the encrypted packet.

In a third implementation, alone or in combination with one or more of the first and second implementations, the one or more instructions, that cause the one or more processors to selectively encrypt the packet using the null encryption for TLS or the combination of encryption associated with the protocol and TLS encryption, cause the one or more processors to encrypt the packet using the null encryption for TLS to form a first encrypted packet, and transmit the first encrypted packet; determine that the first encrypted packet has been dropped by the security device, and encrypt, when the first encrypted packet has been dropped, the packet using the combination of encryption associated with the protocol and TLS encryption to generate a second encrypted packet, the second encrypted packet is the encrypted packet.

In a fourth implementation, alone or in combination with one or more of the first through third implementations, the packet is transmitted for communicating with a remote device via the tunnel, and encapsulate, based on determining that the packet has been dropped, the packet with transmission control protocol (TCP) encapsulation to generate a TCP encapsulated packet, and transmit the TCP encapsulated packet for communicating with the remote device.

In a fifth implementation, alone or in combination with one or more of the first through fourth implementations, process 700 includes transmitting an Internet key exchange (IKE) packet as part of an IKE procedure for establishing the tunnel; determining that the IKE packet has been dropped by the security device; encrypt, after is determining that the IKE packet has been dropped, the IKE packet using a combination of IKE encryption and transport layer security (TLS) encryption to generate an encrypted IKE packet; and transmitting the encrypted IKE packet for establishing the tunnel.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   transmitting, by a device, an Internet key exchange (IKE) packet as part of an IKE procedure for establishing or communicating on a virtual private network (VPN), the packet being associated with a protocol;
   determining, by the device, that the IKE packet has been dropped by a security device;
   encapsulating, by the device and when the IKE packet has been dropped, the IKE packet with transmission control protocol (TCP) encapsulation to generate a TCP encapsulated IKE packet;
   transmitting, by the device, the TCP encapsulated packet for establishing or communicating on the VPN;
   determining, by the device, that the TCP encapsulated packet has been dropped by the security device;
   selectively encrypting, by the device and when the TCP encapsulated packet has been dropped, the IKE packet using a null encryption for transport layer security (TLS) or a combination of encryption associated with the protocol and TLS encryption to generate an encrypted packet; and
   transmitting, by the device, the encrypted packet on the VPN for establishing or communicating on the VPN.

2. The method of claim 1, wherein at least one of the IKE packet, the TCP encapsulated packet, or the encrypted packet is directed to destination port 443.

3. The method of claim 1, further comprising determining that a version of TLS to be used supports null encryption, and
   wherein selectively encrypting the IKE packet using the null encryption for TLS or the combination of encryption associated with the protocol and TLS encryption includes:
      encrypting the IKE packet using the null encryption for TLS based on determining that the version of TLS to be used supports null encryption to generate the encrypted packet.

4. The method of claim 1, further comprising determining that a version of TLS to be used does not support null encryption, and
   wherein selectively encrypting the IKE packet using the null encryption for TLS or the combination of encryption associated with the protocol and TLS encryption includes:
      encrypting the IKE packet using the combination of encryption associated with the protocol and TLS encryption based on determining that the version of TLS to be used does not support null encryption to generate the encrypted packet.

5. The method of claim 1, wherein selectively encrypting the IKE packet using the null encryption for TLS or the combination of encryption associated with the protocol and TLS encryption includes encrypting the IKE packet using the null encryption for TLS to form a first encrypted packet, and
   wherein the method further comprises:
      transmitting the first encrypted packet;
      determining that the first encrypted packet has been dropped by the security device; and
      encrypting, when the first encrypted packet has been dropped, the IKE packet using the combination of encryption associated with the protocol and TLS encryption to generate a second encrypted packet,
      wherein the second encrypted packet is the encrypted packet.

6. The method of claim 1, wherein selectively encrypting the IKE packet using the null encryption for TLS or the combination of encryption associated with the protocol and TLS encryption includes encrypting the IKE packet using the null encryption for TLS, and
   wherein the method further comprises:
      subjecting the IKE packet to hashing of a hash algorithm of TLS and subjecting the IKE packet to hashing of a hash algorithm associated with the protocol.

7. The method of claim 1, wherein selectively encrypting the IKE packet using the null encryption for TLS or the combination of encryption associated with the protocol and TLS encryption includes encrypting the IKE packet using the combination of encryption associated with the protocol and TLS encryption, and
   wherein the method further comprises:
      subjecting the IKE packet to hashing of a hash algorithm of TLS and subjecting the IKE packet to hashing of a hash algorithm associated with the protocol.

8. A device, comprising:
   one or more memories; and
   one or more processors to:
      transmit an Internet key exchange (IKE) packet as part of an IKE procedure for communicating with a remote device,
         the packet being associated with a protocol;
      determine that the IKE packet has been dropped by a security device;

encrypt, after determining that the IKE packet has been dropped, the IKE packet using a null encryption for transport layer security (TLS) to generate a first encrypted packet;

transmit the first encrypted packet for communicating with the remote device;

determine that the first encrypted packet has been dropped by the security device;

encrypt, after determining that the first encrypted packet has been dropped, the IKE packet using a combination of encryption associated with the protocol and TLS encryption to generate a second encrypted packet; and transmit the second encrypted packet for communicating with the remote device.

9. The device of claim 8, wherein the one or more processors, when encrypting the IKE packet using the combination of encryption associated with the protocol and TLS encryption, are to:

select an encryption algorithm for the TLS encryption that is at least as strong as an encryption algorithm associated with the protocol; and encrypt the IKE packet using the combination of encryption associated with the protocol and the encryption algorithm for the TLS encryption.

10. The device of claim 8, wherein the one or more processors are further to:

transmit the IKE packet to establish a virtual private network (VPN) tunnel with the remote device;

determine that the IKE packet has been dropped by the security device;

encapsulate, when the IKE packet has been dropped, the IKE packet with TCP encapsulation to generate a TCP encapsulated IKE packet; and transmit the TCP encapsulated IKE packet for establishing the VPN tunnel.

11. The device of claim 10, wherein the TCP encapsulated IKE packet is directed to destination port 443.

12. The device of claim 10, wherein the one or more processors are further to:

determine that the TCP encapsulated IKE packet has been dropped by the security device;

encrypt, when the TCP encapsulated IKE packet has been dropped, the IKE packet using a combination of IKE encryption and TLS encryption to generate an encrypted IKE packet; and transmit the encrypted IKE packet for establishing the VPN tunnel.

13. The device of claim 8, wherein the one or more processors, when determining that the IKE packet has been dropped by the security device, are to:

determine that the IKE packet has been dropped by the security device based on receiving no reply to the IKE packet from the security device for a threshold amount of time, or determine that the IKE packet has been dropped by the security device based on receiving a notification from the security device indicating that the IKE packet has been dropped.

14. The device of claim 8, the one or more processors are further to:

encapsulate, based on determining that the IKE packet has been dropped, the IKE packet with transmission control protocol (TCP) encapsulation to generate a TCP encapsulated IKE packet; and transmit the TCP encapsulated IKE packet for communicating with the remote device.

15. A non-transitory computer-readable medium storing instructions, the instructions comprising:

one or more instructions that, when executed by one or more processors, cause the one or more processors to:

transmit an Internet key exchange (IKE) packet as part of an IKE procedure for communicating via a tunnel, the IKE packet being associated with a protocol;

determine that the IKE packet has been dropped by a security device;

selectively encrypt, after determining that the IKE packet has been dropped, the IKE packet using a null encryption for transport layer security (TLS) or a combination of encryption associated with the protocol and TLS encryption to generate an encrypted IKE packet; and transmit the encrypted IKE packet for communicating via the tunnel.

16. The non-transitory computer-readable medium of claim 15, wherein the one or more instructions, when executed by the one or more processors, further cause the one or more processors to determine that a version of TLS to be used supports null encryption, and wherein the one or more instructions, that cause the one or more processors to selectively encrypt the IKE packet using the null encryption for TLS or the combination of encryption associated with the protocol and TLS encryption, further cause the one or more processors to:

encrypt the IKE packet using the null encryption for TLS based on determining that the version of TLS to be used supports null encryption to generate the encrypted IKE packet.

17. The non-transitory computer-readable medium of claim 15, wherein the one or more instructions, when executed by the one or more processors, further cause the one or more processors to determine that a version of TLS to be used does not support null encryption, and wherein the one or more instructions, that cause the one or more processors to selectively encrypt the IKE packet using the null encryption for TLS or the combination of encryption associated with the protocol and TLS encryption, further cause the one or more processors to:

encrypt the IKE packet using the combination of encryption associated with the protocol and TLS encryption based on determining that the version of TLS to be used does not support null encryption to generate the encrypted IKE packet.

18. The non-transitory computer-readable medium of claim 15, wherein the one or more instructions, that cause the one or more processors to selectively encrypt the IKE packet using the null encryption for TLS or the combination of encryption associated with the protocol and TLS encryption, cause the one or more processors to encrypt the IKE packet using the null encryption for TLS to form a first encrypted IKE packet, and wherein the one or more instructions, when executed by the one or more processors, further cause the one or more processors to:

transmit the first encrypted IKE packet;

determine that the first encrypted IKE packet has been dropped by the security device; and encrypt, when the first encrypted IKE packet has been dropped, the IKE packet using the combination of encryption associated with the protocol and TLS encryption to generate a second encrypted packet, wherein the second encrypted packet is the encrypted IKE packet.

19. The non-transitory computer-readable medium of claim 15, wherein the IKE packet is transmitted for communicating with a remote device via the tunnel, and
wherein the one or more instructions, when executed by the one or more processors, further cause the one or more processors to:
encapsulate, based on determining that the IKE packet has been dropped, the IKE packet with transmission control protocol (TCP) encapsulation to generate a TCP encapsulated IKE packet; and
transmit the TCP encapsulated IKE packet for communicating with the remote device.

20. The non-transitory computer-readable medium of claim 15, wherein the one or more instructions, when executed by the one or more processors, further cause the one or more processors to:
transmit the IKE packet for establishing the tunnel;
determine that the IKE packet has been dropped by the security device;
encrypt, after determining that the IKE packet has been dropped, the IKE packet using a combination of IKE encryption and TLS encryption to generate an encrypted IKE packet; and
transmit the encrypted IKE packet for establishing the tunnel.

* * * * *